(12) United States Patent
Kanzawa et al.

(10) Patent No.: US 10,846,817 B2
(45) Date of Patent: Nov. 24, 2020

(54) SYSTEMS AND METHODS FOR REGISTERING 3D DATA WITH 2D IMAGE DATA

(71) Applicant: Toyota Research Institute, Inc., Los Altos, CA (US)

(72) Inventors: Yusuke Kanzawa, Ann Arbor, MI (US); Michael James Delp, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 97 days.

(21) Appl. No.: 16/192,225

(22) Filed: Nov. 15, 2018

(65) Prior Publication Data

US 2020/0160487 A1 May 21, 2020

(51) Int. Cl.

| G06T 3/00 | (2006.01) |
|---|---|
| G06T 7/11 | (2017.01) |
| G06K 9/34 | (2006.01) |
| G06T 7/20 | (2017.01) |
| G06K 9/62 | (2006.01) |
| G06K 9/00 | (2006.01) |

(52) U.S. Cl.
CPC ........ G06T 3/0068 (2013.01); G06K 9/00208 (2013.01); G06K 9/342 (2013.01); G06K 9/6268 (2013.01); G06T 7/11 (2017.01); G06T 7/20 (2013.01); *G06T 2207/10028* (2013.01)

(58) Field of Classification Search
CPC .............. G06K 9/00201; G06K 9/342; G06K 9/00208; G06T 7/337; G06T 7/11; G06T 7/20; G06T 3/0068; G06T 2207/10028
See application file for complete search history.

(56) References Cited

U.S. PATENT DOCUMENTS

| 8,179,393 B2 | 5/2012 | Minear et al. |
| 8,290,305 B2 | 10/2012 | Minear et al. |

(Continued)

OTHER PUBLICATIONS

Cui et al., "Line-Based Registration of Panoramic Images and LiDAR Point Clouds for Mobile Mapping," found at http://www.mdpi.com/1424-8220/17/1/70/pdf (accessed on Sep. 5, 2018).

(Continued)

*Primary Examiner* — Casey L Kretzer
(74) *Attorney, Agent, or Firm* — Christopher G. Darrow; Darrow Mustafa PC

(57) ABSTRACT

Systems and methods described herein relate to registering three-dimensional (3D) data with two-dimensional (2D) image data. One embodiment receives 3D data from one or more sensors and 2D image data from one or more cameras; identifies a 3D segment in the 3D data and associates it with an object; classifies pixels in the 2D image data; determines a speed and a heading for the object; and registers the 3D segment with a portion of the classified pixels by either (1) shifting the 3D segment to a position that, based on the associated object's speed and heading, corresponds to a 2D image data capture time and projecting the time-shifted 3D segment onto 2D image space; or (2) projecting the 3D segment onto 2D image space and shifting the projected 3D segment to a position that, based on the associated object's speed and heading, corresponds to a 2D image data capture time.

18 Claims, 15 Drawing Sheets

(56) References Cited

U.S. PATENT DOCUMENTS

| | | | |
|---|---|---|---|
| 9,904,867 | B2 | 2/2018 | Fathi et al. |
| 10,430,641 | B2* | 10/2019 | Gao .................. G06K 9/00208 |
| 2007/0031064 | A1* | 2/2007 | Zhao ........................ G06T 7/33 382/285 |
| 2018/0260613 | A1* | 9/2018 | Gao ......................... G06T 7/37 |
| 2019/0287254 | A1* | 9/2019 | Lakshmi Narayanan ................... G06T 5/002 |
| 2020/0026282 | A1* | 1/2020 | Choe .................. G05D 1/0257 |

OTHER PUBLICATIONS

Pujol-Miro et al., "Registration of Images to Unorganized 3D Point Clouds Using Contour Cues," 2017 25th European Signal Processing Conference (EUSIPCO), pp. 91-95, found at https://www.eurasip.org/Proceedings/Eusipco/Eusipco2017/papers/1570341236.pdf (accessed on Sep. 5, 2018).

De Silva et al., "Fusion of LiDAR and Camera Sensor Data for Environment Sensing in Driverless Vehicles," found at https://arxiv.org/ftp/arxiv/papers/1710/1710.06230.pdf (accessed on Apr. 10, 2018).

Yao, et al. "Registration of Vehicle-Borne Point Clouds and Panoramic Images Based on Sensor Constellations," found at http://www.mdpi.com/1424-8220/17/4/837/pdf (accessed on Apr. 10, 2018).

Mishra et al., "A Review of Optical Imagery and Airborne LIDAR Data Registration Methods," The Open Remote Sensing Journal, 2012, No. 5, 54-63, found at https://benthamopen.com/contents/pdf/TORMSJ/TORMSJ-5-54.pdf (accessed on Sep. 5, 2018).

U.S. Appl. No. 16/033,289, filed Jul. 12, 2018.
U.S. Appl. No. 16/192,267, filed Nov. 15, 2018.

* cited by examiner

SYSTEMS AND METHODS FOR REGISTERING 3D DATA WITH 2D IMAGE DATA

TECHNICAL FIELD

The subject matter described herein relates in general to machine vision and more specifically to systems and methods for registering three-dimensional (3D) data with two-dimensional (2D) image data.

BACKGROUND

An important aspect of robotics is machine vision. For example, autonomous vehicles need to be able to sense the surrounding environment (e.g., roadway, obstacles, etc.) and navigate autonomously without human input or at least partially without human input. In robotics applications such as autonomous vehicles, it is advantageous to combine 2D image data from cameras with 3D data such as point-cloud data from the same scene. Combining these two types of data necessarily includes a registration step to align the points spatially.

SUMMARY

An example of a system for registering 3D data with 2D image data is presented herein. The system comprises one or more sensors to produce 3D data and one or more cameras to produce 2D image data. The system also includes one or more processors and a memory communicably coupled thereto. The memory stores a 3D-data segmentation module including instructions that when executed by the one or more processors cause the one or more processors to identify, in the 3D data, a 3D segment. The memory also stores a data association module including instructions that when executed by the one or more processors cause the one or more processors to associate the 3D segment with an object. The memory also stores an image segmentation module including instructions that when executed by the one or more processors cause the one or more processors to classify pixels in the 2D image data. The memory also stores a velocity estimation module including instructions that when executed by the one or more processors cause the one or more processors to determine a speed and a heading for the object. The memory also stores an integration module including instructions that when executed by the one or more processors cause the one or more processors to register the 3D segment with a portion of the classified pixels in the 2D image data by either (1) shifting the 3D segment to a position that, based on the associated object's speed and heading, corresponds to a time at which the 2D image data was captured and projecting the time-shifted 3D segment onto 2D image space; or (2) projecting the 3D segment onto 2D image space and shifting the projected 3D segment to a position that, based on the associated object's speed and heading, corresponds to a time at which the 2D image data was captured.

Another embodiment is a method of registering three-dimensional (3D) data with two-dimensional (2D) image data, comprising receiving 3D data from one or more sensors; receiving 2D image data from one or more cameras; identifying a 3D segment in the 3D data; associating the 3D segment with an object; classifying pixels in the 2D image data; determining a speed and a heading for the object; and registering the 3D segment with a portion of the classified pixels in the 2D image data by either (1) shifting the 3D segment to a position that, based on the associated object's speed and heading, corresponds to a time at which the 2D image data was captured and projecting the time-shifted 3D segment onto 2D image space; or (2) projecting the 3D segment onto 2D image space and shifting the projected 3D segment to a position that, based on the associated object's speed and heading, corresponds to a time at which the 2D image data was captured.

Another embodiment is a system for registering 3D data with 2D image data, comprising one or more sensors to produce 3D data and one or more cameras to produce 2D image data. The system also includes one or more processors and a memory communicably coupled thereto. The memory stores a 3D-data segmentation module including instructions that when executed by the one or more processors cause the one or more processors to identify, in the 3D data, 3D boundary information that includes one of a convex hull, a voxelization, a non-convex hull, a bounding box, and mesh data. The memory also stores an image segmentation module including instructions that when executed by the one or more processors cause the one or more processors to produce an instance segmentation from pixels in the 2D image data, the instance segmentation identifying a portion of the pixels in the 2D image data as a specific instance of a particular class of object. The memory also stores an integration module including instructions that when executed by the one or more processors cause the one or more processors to project the 3D boundary information onto 2D image space to produce projected 3D boundary information and match the projected 3D boundary information with the instance segmentation to register the projected 3D boundary information with the instance segmentation.

Another embodiment is a method of registering three-dimensional (3D) data with two-dimensional (2D) image data, comprising receiving 3D data from one or more sensors; receiving 2D image data from one or more cameras; identifying 3D boundary information in the 3D data; producing an instance segmentation from pixels in the 2D image data, the instance segmentation identifying a portion of the pixels in the 2D image data as a specific instance of a particular class of object; projecting the 3D boundary information onto 2D image space to produce projected 3D boundary information; and matching the projected 3D boundary information with the instance segmentation to register the projected 3D boundary information with the instance segmentation.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
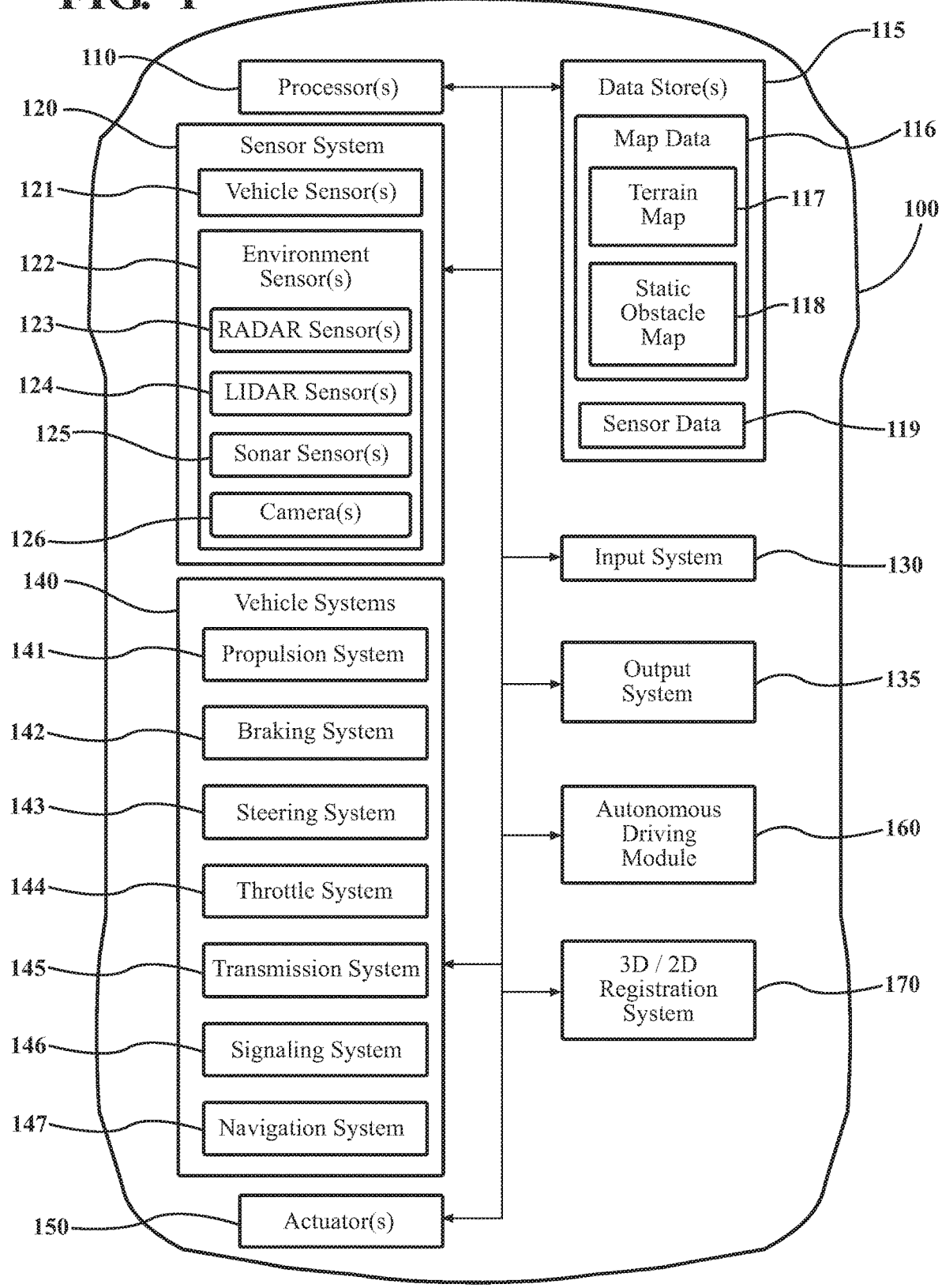
FIG. 1 illustrates one embodiment of a vehicle within which systems and methods disclosed herein may be implemented.

At least two challenges arise with 3D-to-2D ("3D/2D") registration. First, the 2D image data and the 3D data are not necessarily captured at the same instant in time. Sometimes referred to as the "capture-timing gap" problem, this makes it difficult to match up the 3D and 2D data because of moving objects in the scene. For example, for a difference in capture time of only 50 ms, a vehicle traveling 70 mph travels about 1.56 meters, and a typical vehicle is only 3-5 meters long. Second, the 2D sensors (e.g., cameras) capture image data from a different vantage point than the 3D sensors. Therefore, even if the 2D image data and the 3D data are somehow captured at exactly the same time, there is still parallax error between the two kinds of sensor data.

Systems and methods are presented that overcome the "capture-timing gap" and parallax problems. In one embodiment, 3D data is captured from one or more sensors, 2D image data is captured from one or more cameras, and pixels in the 2D image data are classified. A 3D segment (e.g., a point-cloud cluster or 3D boundary information derived from a point-cloud cluster) is associated with an object, and the speed and heading of the object is measured. Based on that measured speed and heading, the 3D segment is shifted to a position that coincides with the time at which the 2D image data was captured, thereby correcting for the "capture-timing gap" problem. The time-shifted 3D segment can be projected onto 2D space and registered with a portion of the classified pixels in the 2D image data. Alternatively, the 3D segment can be projected onto 2D image space, and the projected 3D segment can be time-shifted to a position that coincides with the time at which the 2D image data was captured to correct for the "capture-timing gap" problem.

In some embodiments, in addition to time-shifting the point-cloud cluster or 3D boundary information to compensate for the "capture-timing gap," classifying pixels in the 2D image data includes semantic segmentation of the 2D image data. This involves assigning a class label to each pixel in the 2D image data (e.g., a frame). Semantic segmentation can aid in associating a time-shifted and projected 3D segment with a particular class of object (e.g., person, vehicle, tree, etc.) during registration with the 2D image data.

In other embodiments, in addition to time-shifting the point-cloud cluster or 3D boundary information to compensate for the "capture-timing gap," classifying pixels in the 2D image data includes instance segmentation of the 2D image data. Instance segmentation involves not only assigning a class label to each pixel in the 2D image data but also includes labeling regions of pixels belonging to the same class as individual instances of a particular kind of object (e.g., Person No. 3 in a group of five people or Vehicle No. 2 in a row of vehicles parked along a street). In these embodiments, shape matching of time-shifted and projected 3D boundary information and an instance segmentation of an object in the 2D image data assists in overcoming the parallax problem discussed above.

In still other embodiments, instance segmentation and shape matching, as explained above, are used to aid registration of the 3D data with the 2D image data without time-shifting the 3D boundary information based on the measured speed and heading of an object associated with the 3D boundary information.

The techniques described herein have wide application in the field of robotics and machine vision. One example of an environment in which the inventive systems and methods can be implemented is a semi-autonomous or fully autonomous vehicle. This is not the only environment in which the inventive techniques can be applied, however. The inventive techniques can be applied to a variety of other types of robots, as those skilled in the art will recognize. For the sake of illustration, embodiments in the environment of a vehicle are described in detail below.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-15 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes a 3D/2D registration system 170 that is implemented to perform methods and other functions as disclosed herein relating to registering 3D data with 2D image data. In this description, "registering" 3D data with 2D image data refers to lining up 3D data projected onto 2D image space with 2D image data from the same scene so that the two kinds of data can be used in combination. Vehicle 100 can use this combined 3D and 2D data in performing its autonomous-driving functions (identifying obstacles, etc.).

Figure 2:
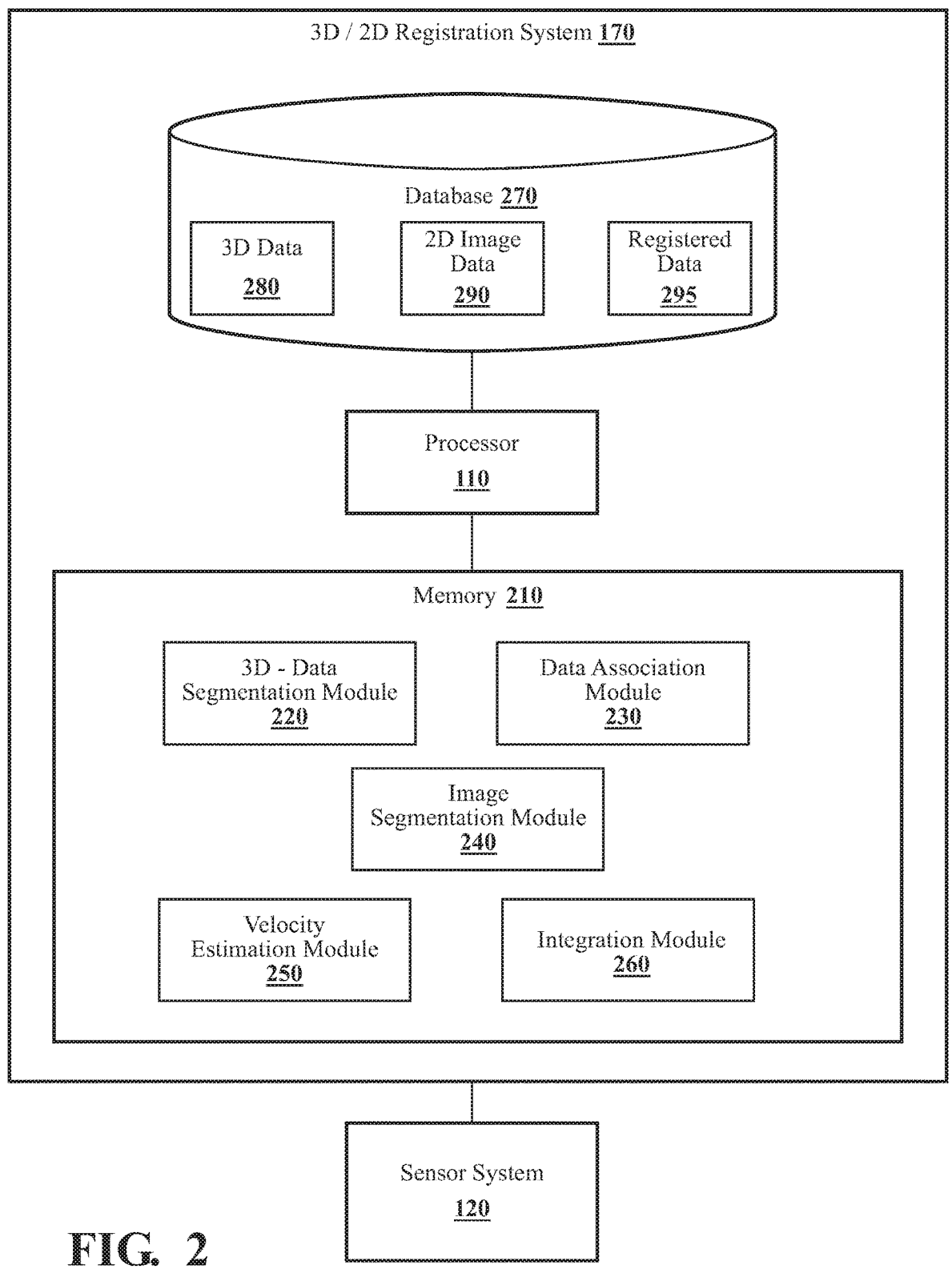
FIG. 2 illustrates one embodiment of a 3D/2D registration system.

With reference to FIG. 2, one embodiment of the 3D/2D registration system 170 of FIG. 1 is further illustrated. The 3D/2D registration system 170 is shown as including one or more processors 110 from the vehicle 100 of FIG. 1. Accordingly, the one or more processors 110 may be a part of the 3D/2D registration system 170, the 3D/2D registration system 170 may include one or more separate processors from the one or more processors 110 of the vehicle 100, or the 3D/2D registration system 170 may access the one or more processors 110 through a data bus or another communication path, depending on the embodiment. In one embodiment, the 3D/2D registration system 170 includes a memory 210 that stores a 3D-data segmentation module 220, a data association module 230, an image segmentation module 240, a velocity estimation module 250, and an integration module 260. The memory 210 is a random-access memory (RAM), read-only memory (ROM), a hard-disk drive, a flash memory, or other suitable memory for storing the modules 220, 230, 240, 250, and 260. The modules 220, 230, 240, 250, and 260 are, for example, computer-readable instructions that when executed by the one or more processors 110, cause the one or more processors 110 to perform the various functions disclosed herein.

Figure 3:
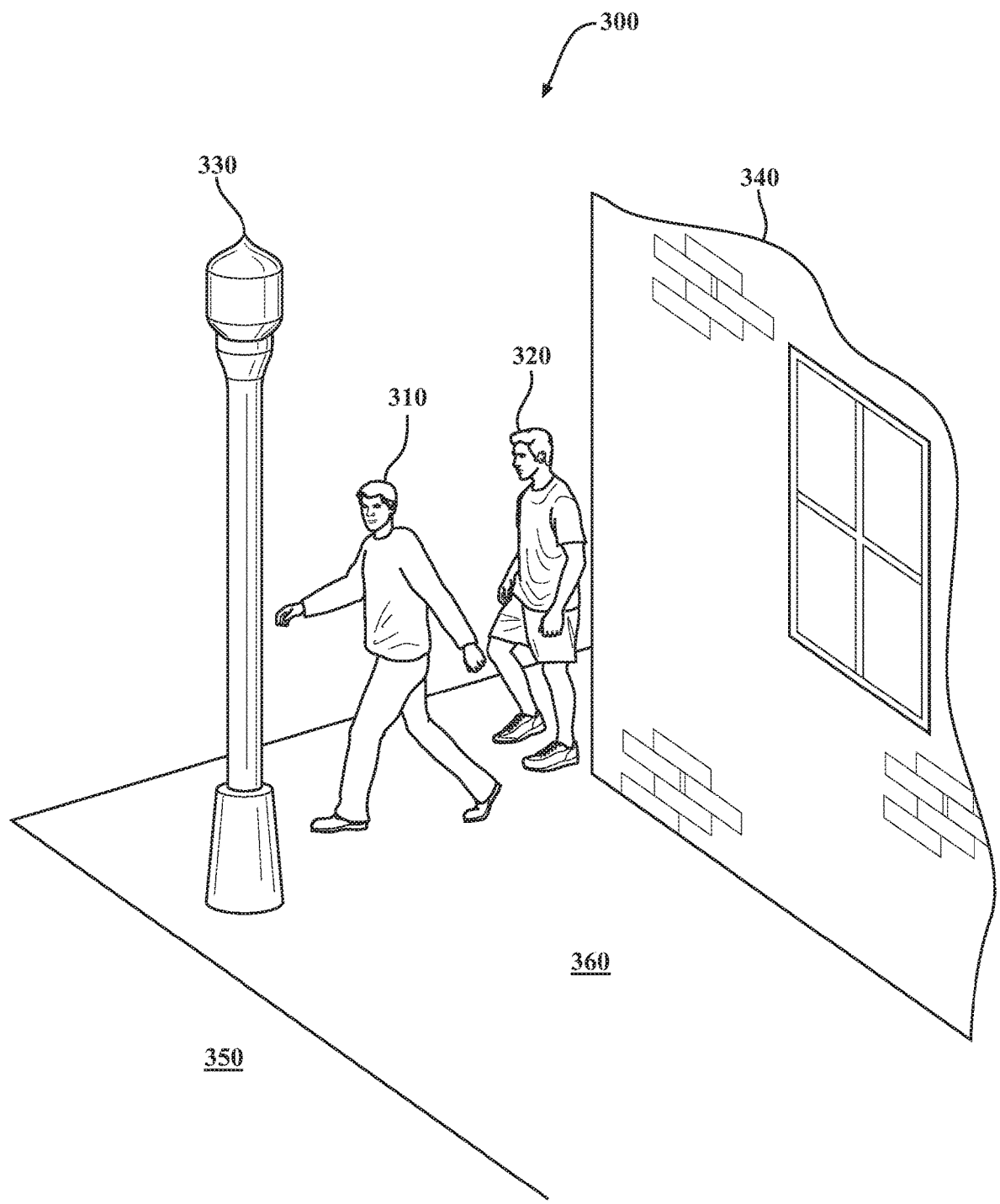
FIG. 3 illustrates one example of a camera image as may be captured by a camera, in accordance with an illustrative embodiment of the invention.

The 3D/2D registration system 170 receives 2D image data 290 from one or more cameras 126 that are part of sensor system 120. FIG. 3 illustrates one example of a camera image as may be captured by a camera 126, in accordance with an illustrative embodiment of the invention. The scene 300 in FIG. 3 includes pedestrian 310, pedestrian 320, lamppost 330, wall 340, road 350, and sidewalk 360. The pedestrians 310 and 320 are presumed to be moving (walking along sidewalk 360), in this example.

Figure 4:
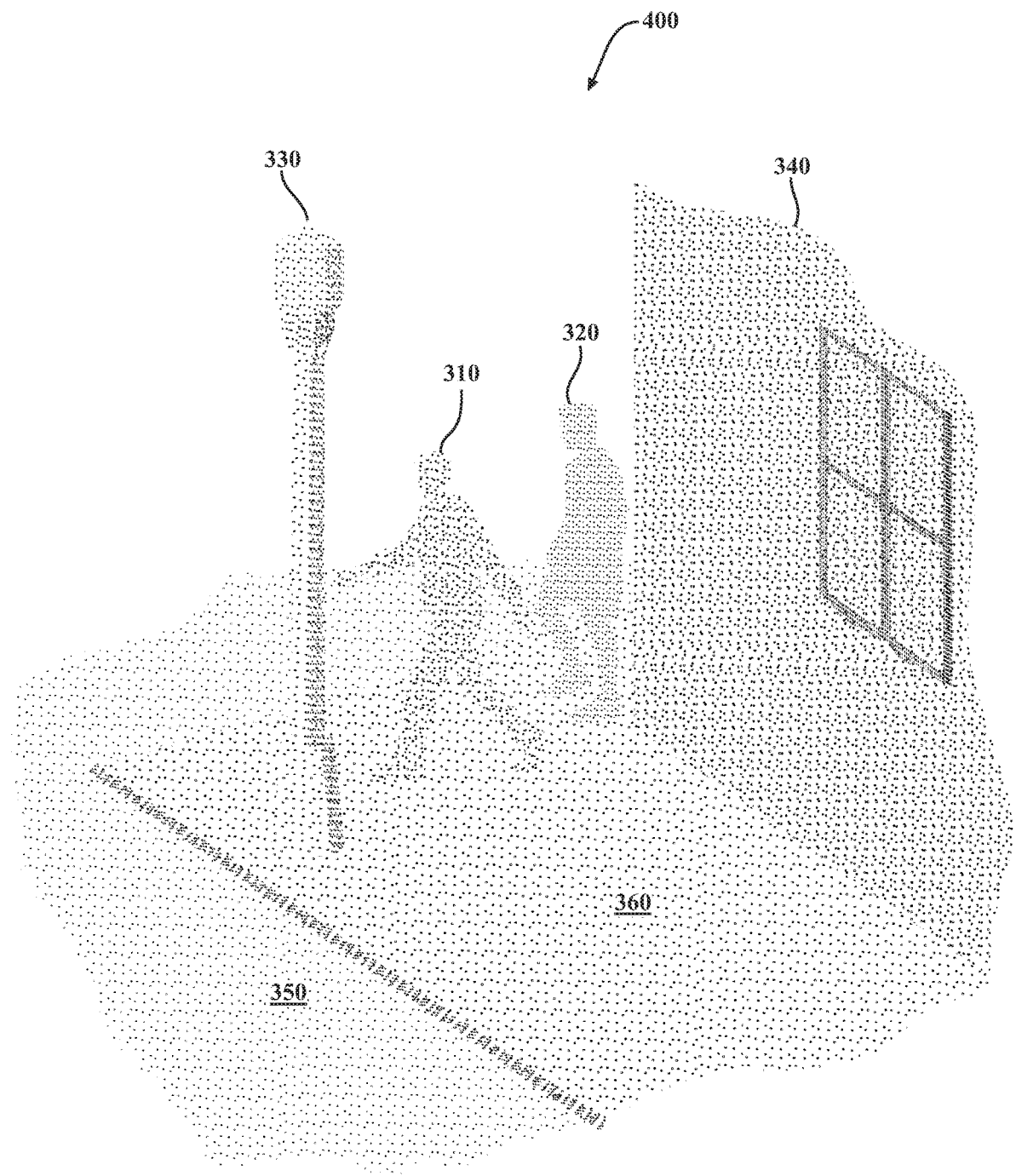
FIG. 4 illustrates one example of a point cloud representing the same scene depicted by the camera image of FIG. 3, in accordance with an illustrative embodiment of the invention.

The 3D/2D registration system 170 receives 3D data 280 from one or more sensors in sensor system 120. The sensors can include Light Detection and Ranging (LIDAR) sensors (see Element 124 in FIG. 1), a set of stereo cameras, Red Green Blue Depth (RGB-D) sensors, radar sensors (see Element 123 in FIG. 1), or a combination of one or more of these types of sensors or one or more other sensors capable of capturing 3D data. These various types of 3D sensors produce what those skilled in the art refer to as a "point cloud" of a scene. FIG. 4 illustrates one example of a point cloud representing the same scene depicted by the camera image of FIG. 3, in accordance with an illustrative embodiment of the invention.

As shown in FIG. 2, 3D data 280 and 2D image data 290 can be stored in a database 270.

3D-data segmentation module 220 generally includes instructions that cause the one or more processors 110 to identify, in the 3D data received from the one or more sensors discussed above, a 3D segment. (Though this description, for simplicity, is cast in terms of a single 3D segment, in practice 3D-data segmentation module 220 can identify a plurality of 3D segments in a point cloud in parallel.) In some embodiments, the 3D segment is a point-cloud cluster. In other embodiments, the 3D segment is 3D boundary information derived from a point-cloud cluster. Examples of 3D boundary information include, without limitation, a convex hull, a voxelization, a non-convex hull, a bounding box, and mesh data. These terms are well known to those skilled in the machine-vision art. For example, a convex hull wholly contains the line segments connecting each of its points, whereas a non-convex hull wholly contains the points but does not necessarily contain every line segment between them.

Data association module 230 generally includes instructions that cause the one or more processors 110 to associate a 3D segment (point-cloud cluster or 3D boundary information) with an object. In some embodiments, the object is one that has previously been tracked by an object-tracking function of vehicle 100. For example, data association module 230 might associate a point-cloud cluster with a previously tracked vehicle or a convex hull with a previously tracked pedestrian.

Image segmentation module 240 generally includes instructions that cause the one or more processors 110 to classify pixels in 2D image data 290. How this classification is done differs, depending on the embodiment.

Figure 5:
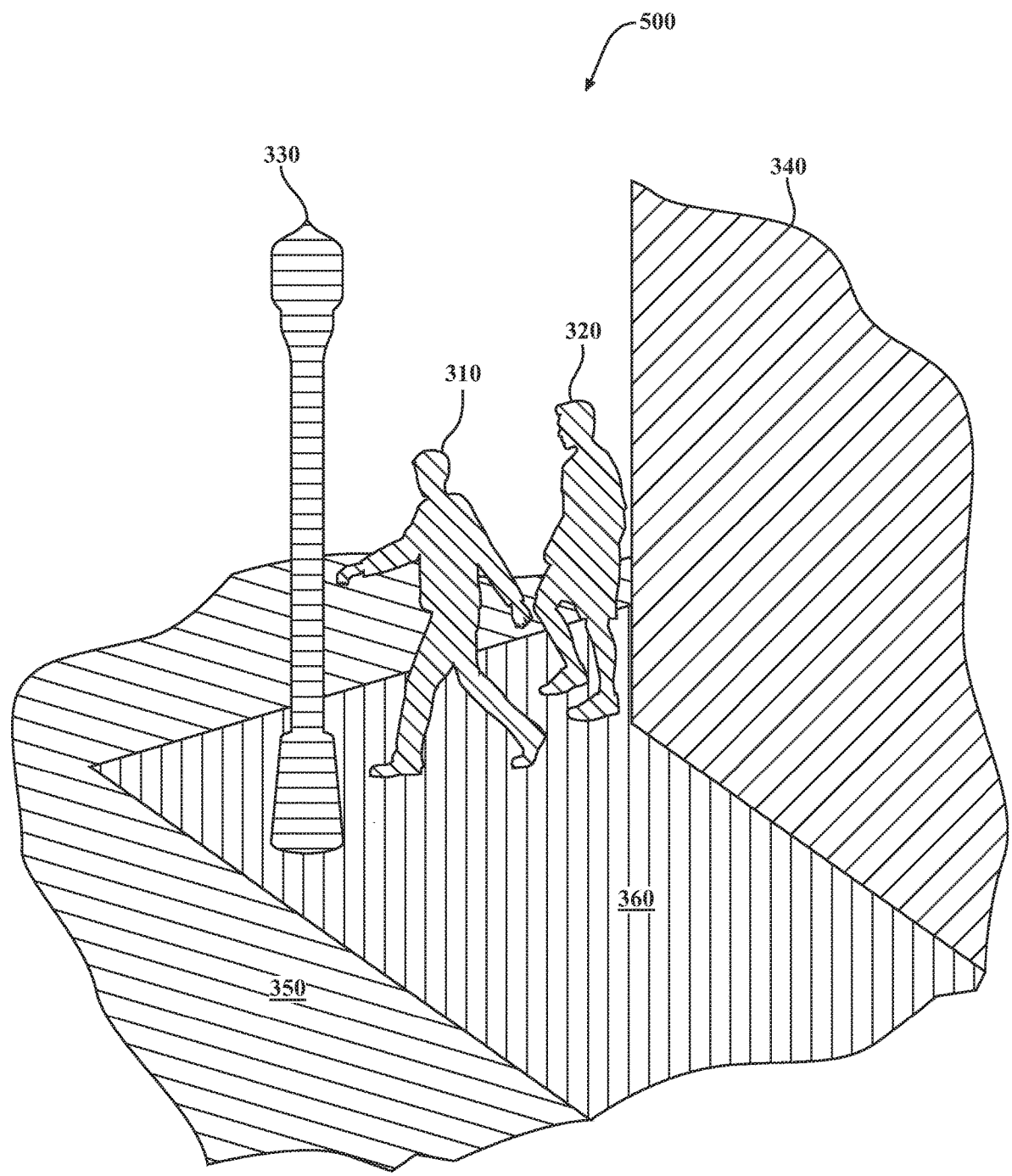
FIG. 5 illustrates the process of semantic segmentation as applied to the camera image of FIG. 3, in accordance with an illustrative embodiment of the invention.

In some embodiments, classifying the pixels includes performing semantic segmentation of the 2D image data 290. As discussed above, this involves assigning a class label to each pixel in the 2D image data (e.g., in a frame). In one embodiment, the class labels are indicated by changing the color of each pixel in accordance with its assigned class. For example, all pixels assigned the class "person" (e.g., a pedestrian) might be colored a particular shade of red, and all pixels assigned the class "grass" might be assigned a particular shade of green. Unlike instance segmentation discussed below, semantic segmentation does not label specific instances of objects, where there are multiple instances of a particular class of object in the scene (e.g., three vehicles). An example of how the scene in FIG. 3 might be semantically segmented is shown in FIG. 5. Note that pedestrian 310 and pedestrian 320 are both labeled with the same color.

Figure 6:
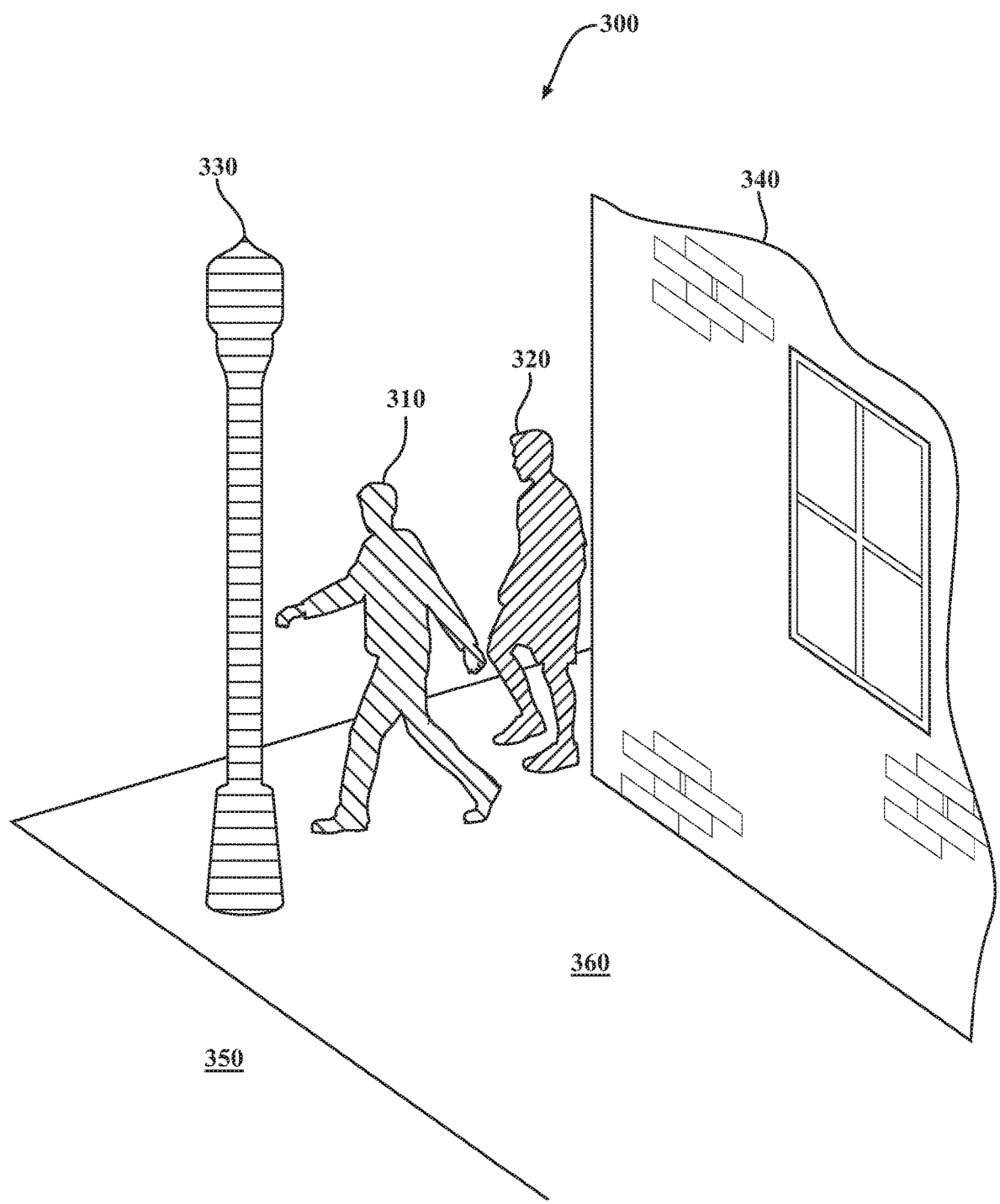
FIG. 6 illustrates the process of instance segmentation as applied to the camera image of FIG. 3, in accordance with an illustrative embodiment of the invention.

In other embodiments, classifying the pixels includes performing instance segmentation of the 2D image data 290. As discussed above, this involves not only assigning a class label to each pixel in the 2D image data but also includes labeling regions of pixels belonging to the same class as a specific instance of a particular kind of object (e.g., Person No. 3 in a group of five people or Vehicle No. 2 in a row of vehicles parked along a street). In instance segmentation, the pixels associated with a particular instance of a class of object (e.g., a specific vehicle, building, tree, person, etc.) receive their own unique identifying color. An example of how the scene in FIG. 3 might be instance segmented is shown in FIG. 6. Note that pedestrian 310 and pedestrian 320 are labeled with different colors, even though the region of pixels associated with each one has the same assigned class (e.g., "person" or "pedestrian"). One well-known algorithm for performing instance segmentation is MaskRCNN.

Velocity estimation module 250 includes instructions that cause the one or more processors 110 to analyze sensor data from sensor system 120 to determine a speed and a heading (i.e., a velocity) for the object with which data association module 230 associated a 3D segment. The sensor data used to estimate velocity can include 3D sensor data (e.g., LIDAR, radar), 2D sensor data (e.g., image data from a camera 126), or a combination of the two. One advantage of radar is that the Doppler shift can be used to estimate the speed of an object directly. Velocity estimation module 250 passes the speed and heading of the object to integration module 260.

Figure 7:
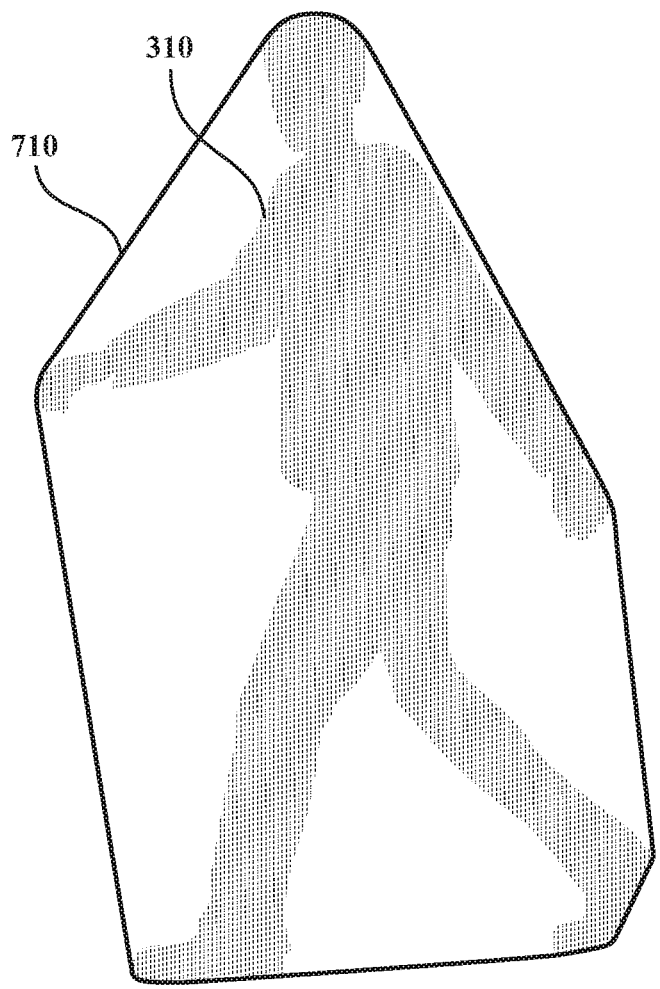
FIG. 7 illustrates 3D boundary information for a pedestrian projected onto 2D image space, in accordance with an illustrative embodiment of the invention.

Integration module 260 generally includes instructions that cause the one or more processors 110 to line up and combine (i.e., register) 3D data with 2D image data to produce registered data 295. As discussed above, 3D-data segmentation module 220 identifies a 3D segment in the 3D data 280, and data association module 230 associates that 3D segment with an object. In some embodiments, the 3D segment is a point-cloud cluster. Examples of point-cloud clusters are illustrated in FIG. 4—those associated with the pedestrians 310 and 320, lamppost 330, wall 340, etc. In other embodiments, the 3D segment is 3D boundary information derived from a point-cloud cluster. A simple example of such 3D boundary information, when projected onto 2D image space, is illustrated in FIG. 7. In FIG. 7, a convex hull has been defined for the point-cloud cluster corresponding to pedestrian 310 in FIG. 4, and that convex hull has been projected onto 2D image space to produce projected 3D boundary information 710.

Figure 8A:
FIG. 8A illustrates misalignment between 2D image data and 3D point-cloud data captured at different times.
Figure 8B:
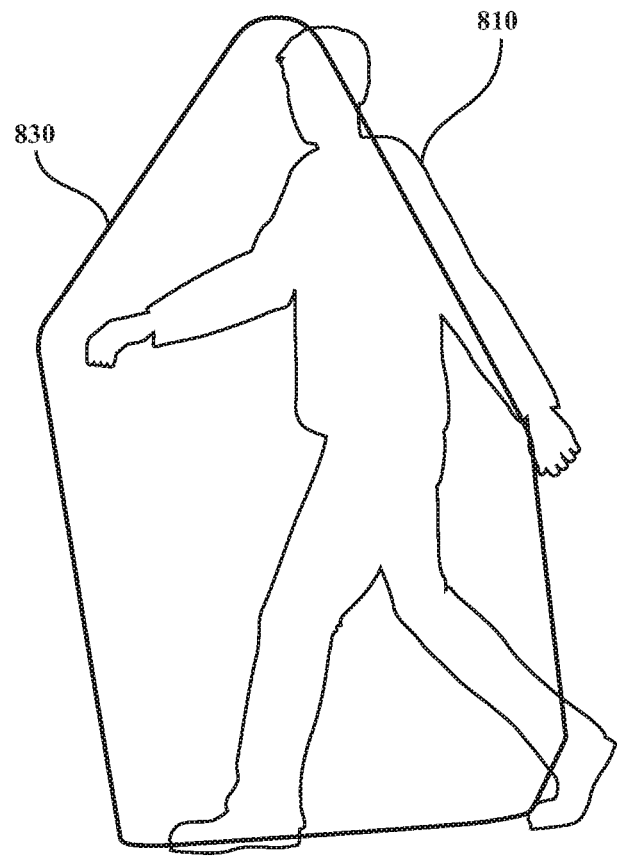
FIG. 8B illustrates misalignment between 2D image data and 3D boundary information derived from 3D data captured at a different time.

As discussed above, one challenge in registering 3D data with 2D image data is that the 3D and 2D data are typically not captured at the same time instant (i.e., the 3D and 2D sensors are not synchronized), and the two types of data are not captured from the same vantage point, resulting in parallax error. The "capture-timing gap" problem is illustrated in FIGS. 8A and 8B for the case of a point-cloud cluster and 3D boundary information, respectively. In FIG. 8A, there is visible misalignment of the outline 810 of the 2D image of pedestrian 310 with the corresponding point-cloud cluster 820. This is due to the 3D and 2D data being captured at different times. In FIG. 8B, there is likewise visible misalignment of the outline 810 of the 2D image of pedestrian 310 with the corresponding projected 3D boundary information 830. Techniques for overcoming this "capture-timing gap" problem are discussed in greater detail below.

In one embodiment, integration module 260 registers the 3D segment discussed above with a portion of the classified pixels in the 2D image data by shifting the 3D segment to a position that, based on the associated object's speed and heading, corresponds to the time at which the 2D image data of the same scene was captured. Integration module 260 then projects this time-shifted 3D segment onto 2D image space.

In another embodiment, the steps just described are performed in the reverse order. That is, integration module 260 registers the 3D segment with a portion of the classified pixels in the 2D image data by projecting the 3D segment onto 2D image space and shifting the projected 3D segment to a position that, based on the associated object's speed and heading, corresponds to the time at which the 2D image data of the same scene was captured.

Figure 9A:
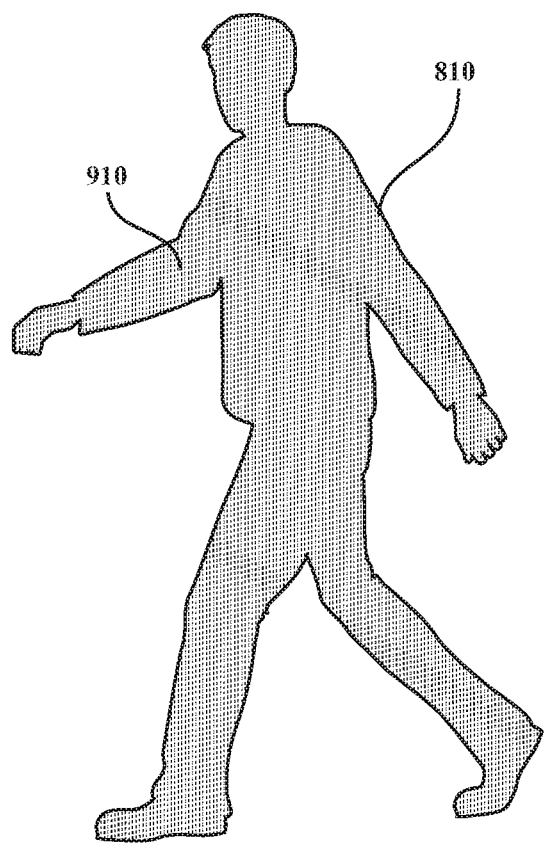
FIG. 9A illustrates time-shifted 3D point-cloud data aligned with 2D image data, in accordance with an illustrative embodiment of the invention.
Figure 9B:
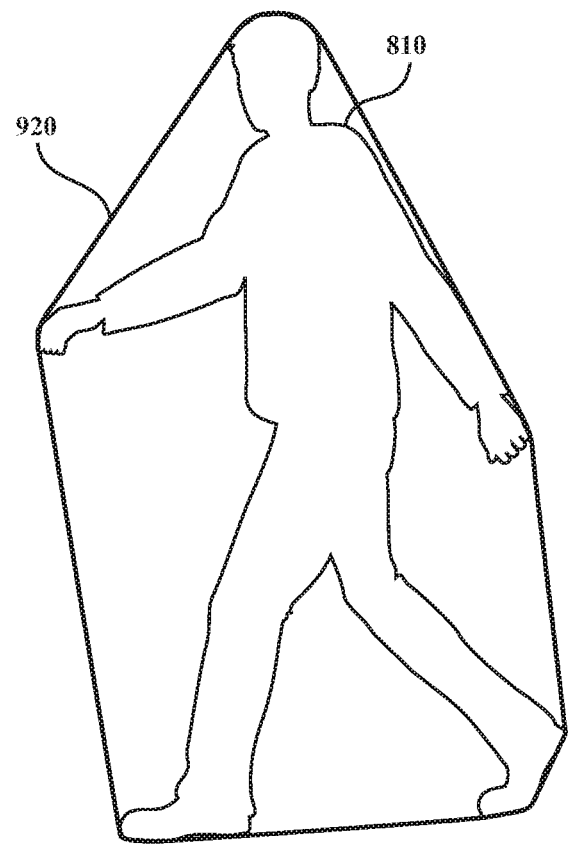
FIG. 9B illustrates time-shifted 3D boundary information aligned with 2D image data, in accordance with an illustrative embodiment of the invention.

The result of time-shifting to account for the velocity of the moving object is illustrated in FIGS. 9A and 9B for a point-cloud cluster and 3D boundary information, respectively. In FIG. 9A, the outline 810 of the 2D image of pedestrian 310 is now correctly aligned with the corresponding time-shifted and projected point-cloud cluster 910. Similarly, in FIG. 9B, the outline 810 of the 2D image of pedestrian 310 is now correctly aligned with the corresponding time-shifted and projected 3D boundary information 920. Also, for simplicity in this description, a single object (i.e., pedestrian 310) has been isolated for illustration in FIGS. 8A, 8B, 9A, and 9B. In practice, a plurality of objects in the scene can be registered substantially at the same time by generalizing the techniques described herein to a plurality of objects.

In embodiments in which image segmentation module 240 performs semantic segmentation of the 2D image data 290, a time-shifted and projected point-cloud cluster might have points that overlap with 2D image pixels from different classes (e.g., "person" and "sidewalk," in the scene of FIG. 3). To resolve such a situation, in one embodiment, integration module 260 counts the number of pixels in each of a plurality of classes that overlap with points in the time-shifted and projected point-cloud cluster, and the time-shifted and projected point-cloud cluster is associated with the class having the greatest number of overlapping pixels. For example, in the scene of FIG. 3, there might be 75 pixels with the assigned class "person" and 15 pixels with the assigned class "sidewalk" that overlap with points in the time-shifted and projected point-cloud cluster 910 corresponding to pedestrian 310. Since 75 is greater than 15, the points in the point-cloud cluster can be associated with the class "person" during registration. This illustrates a "majority-vote" algorithm. In other embodiments, a probabilistic model can be employed based on the proportions of pixels from the plurality of classes having overlapping pixels. In still other embodiments, the results of the pixel count or the predictions of a probabilistic model are forwarded to another functional module of vehicle 100 for further processing and decision making.

In an embodiment in which image segmentation module 240 performs semantic segmentation of the 2D image data and 3D-data segmentation module 220 produces 3D boundary information (e.g., a convex hull), the time-shifted and projected 3D boundary information might have within its boundaries 2D image pixels from different classes (e.g., "person" and "sidewalk," in the scene of FIG. 3). To resolve such a situation, in one embodiment, integration module 260 counts the number of pixels in each of a plurality of classes having pixels that lie within the time-shifted and projected 3D boundary information, and the time-shifted and projected 3D boundary information is associated with the class having the greatest number of pixels within the 3D boundary information. For example, in the scene of FIG. 3, there might be 83 pixels with the assigned class "person" and 19 pixels with the assigned class "sidewalk" inside the time-shifted and projected 3D boundary information 920 corresponding to pedestrian 310. Since 83 is greater than 19, the time-shifted and projected 3D boundary information 920 can be associated with the class "person" during registration. This again illustrates a "majority-vote" algorithm. In other embodiments, a probabilistic model can be employed based on the proportions of pixels from the plurality of classes having pixels that lie within the time-shifted and projected 3D boundary information 920. In still other embodiments, the results of the pixel count or the predictions of a probabilistic model are forwarded to another functional module of vehicle 100 for further processing and decision making.

In an embodiment in which image segmentation module 240 performs instance segmentation of the 2D image data 290, integration module 260 matches the shape of the time-shifted and projected 3D boundary information 920 with an instance segmentation corresponding to a specific instance of a particular class of object (e.g., "Person No. 1," "Tree No. 4," "Vehicle No. 5"). Techniques for shape matching are well known to those skilled in the image-processing and machine-vision art. Integration module 260 can employ any suitable shape-matching algorithm in performing 3D/2D registration. For example, one approach is to associate a closest (nearest-neighbor) instance segmentation with the 3D boundary information. This embodiment employing instance segmentation can aid in overcoming parallax error between the 3D data 280 and the 2D image data 290. In another embodiment discussed below in connection with FIGS. 14 and 15, instance segmentation and shape matching are employed without velocity compensation (time-shifting based on the measured speed and heading of the object associated with the classified pixels in the 2D image data 290).

Figure 10:
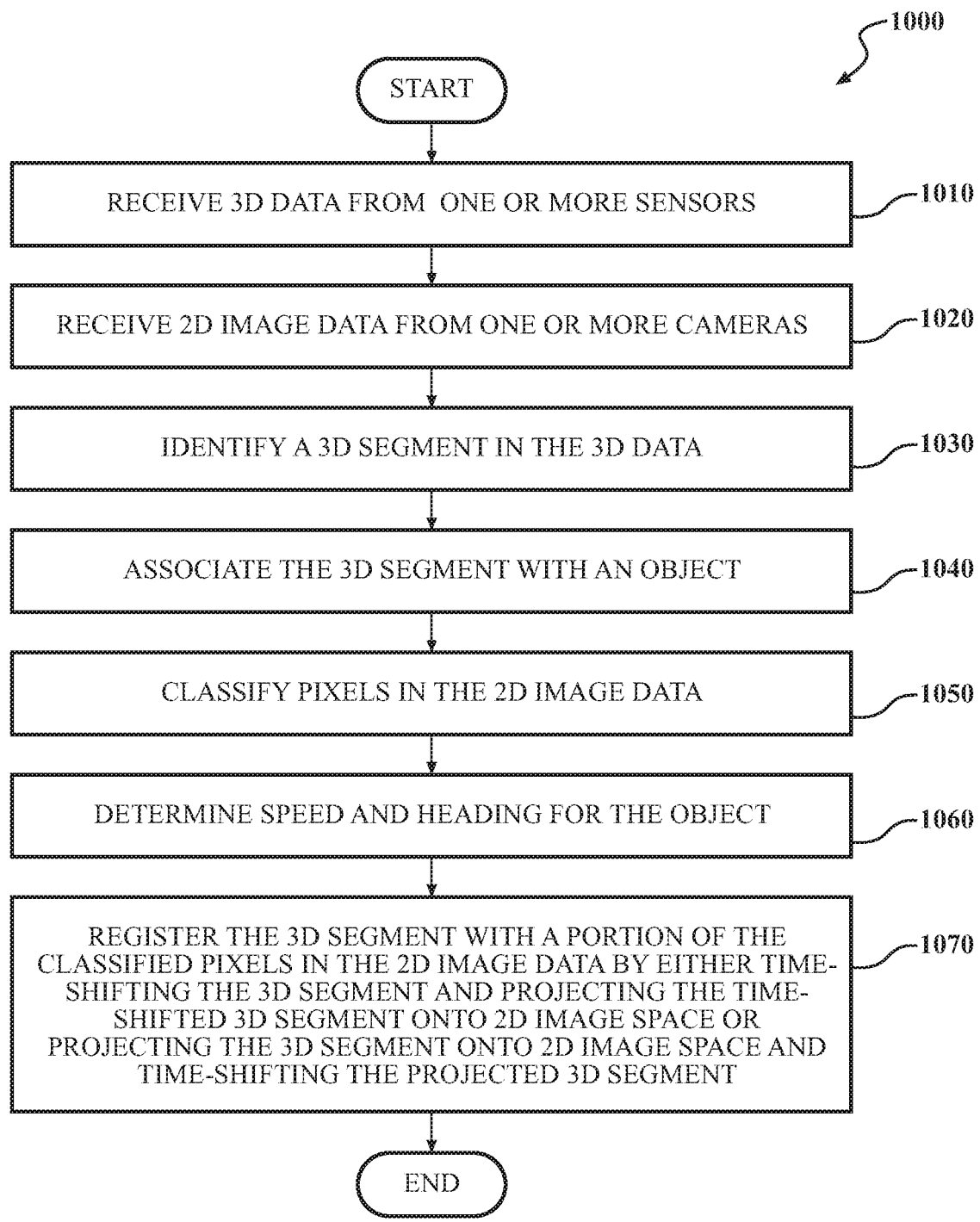
FIG. 10 is a flowchart of a method for registering 3D data with 2D image data, in accordance with an illustrative embodiment of the invention.

FIG. 10 is a flowchart of a method 1000 for registering 3D data with 2D image data, in accordance with an illustrative embodiment of the invention. At block 1010, 3D/2D registration system 170 receives 3D data 280 from one or more sensors in sensor system 120. The sensors can include LIDAR sensors, a set of stereo cameras, RGB-D sensors, radar sensors, or a combination of one or more of these types of sensors or one or more other sensors capable of capturing 3D data. At block 1020, 3D/2D registration system 170 receives image data 290 from one or more cameras 126 that are part of sensor system 120.

At block 1030, 3D-data segmentation module 220 identifies a 3D segment in the 3D data. In some embodiments, the 3D segment is a point-cloud cluster. In other embodiments, the 3D segment is 3D boundary information derived from a point-cloud cluster. Examples of 3D boundary information include, without limitation, a convex hull, a voxelization, a non-convex hull, a bounding box, and mesh data. At block 1040, data association module 230 associates the 3D segment with an object. In some embodiments, the object is one that has previously been tracked by an object-tracking function of vehicle 100. For example, data association module 230 might associate a point-cloud cluster with a previously tracked vehicle or a convex hull with a previously tracked pedestrian.

At block 1050, image segmentation module 240 classifies pixels in the 2D image data 290. Depending on the embodiment, this can include performing semantic segmentation of the 2D image data 290 or performing instance segmentation of the 2D image data 290, as discussed above in connection with, respectively, FIGS. 5 and 6.

At block 1060, velocity estimation module 250 determines the speed and the heading (i.e., the velocity) of the object associated with the 3D segment. The sensor data used to estimate velocity can include 3D sensor data (e.g., LIDAR, radar), 2D sensor data (e.g., image data from a camera 126), or a combination of the two. Velocity estimation module 250 passes the speed and heading of the object to integration module 260.

At block 1070, integration module 260 registers the 3D segment with a portion of the classified pixels in the 2D image data 290 by either (1) shifting the 3D segment to a position that, based on the associated object's speed and heading, corresponds to a time at which the 2D image data 290 was captured and projecting the time-shifted 3D segment onto 2D image space or (2) projecting the 3D segment onto 2D image space and shifting the projected 3D segment to a position that, based on the associated object's speed and heading, corresponds to a time at which the 2D image data was captured. As discussed above, the registered data 295 can be stored in database 270.

Figure 11:
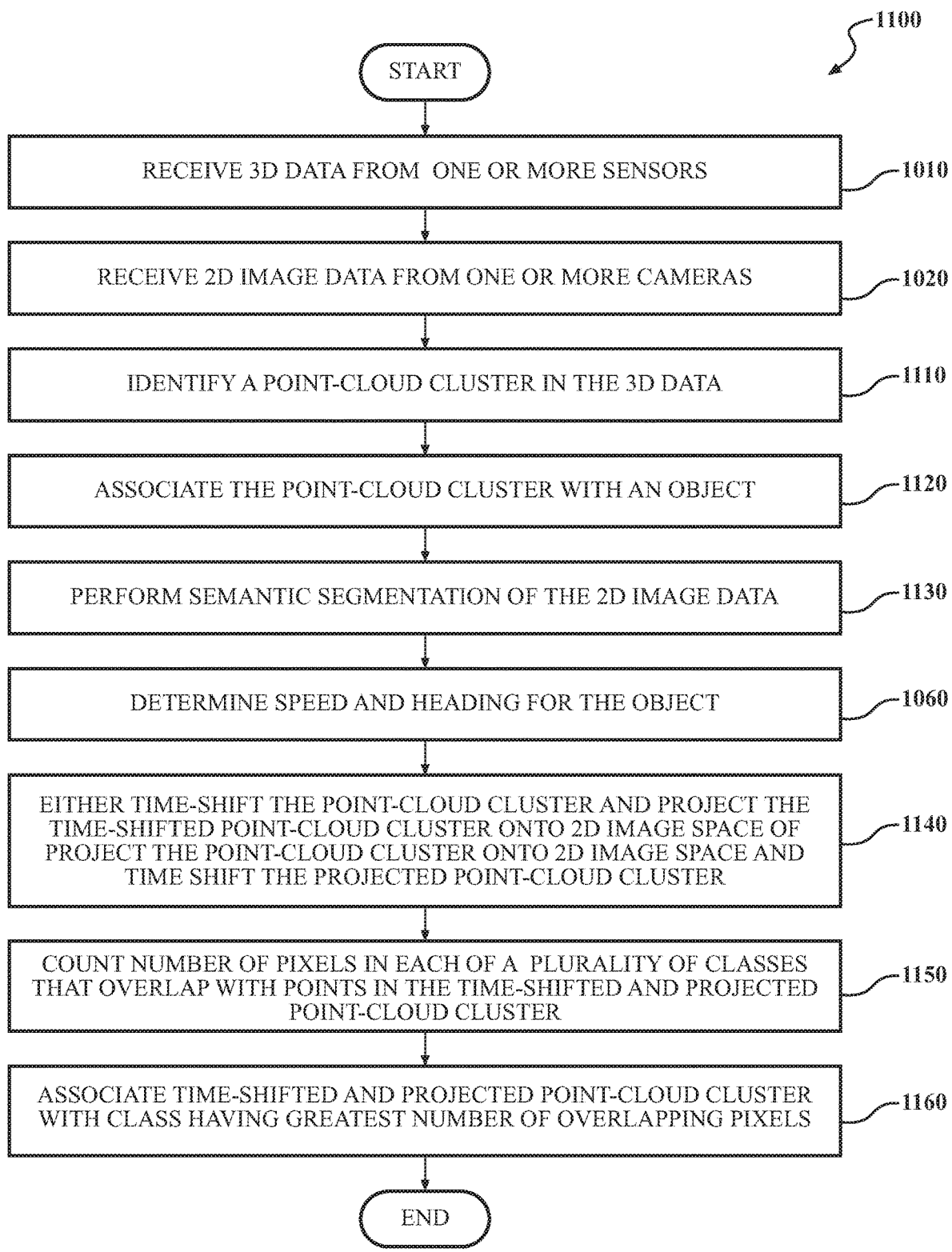
FIG. 11 is a flowchart of a method for registering 3D data with 2D image data that includes semantic segmentation, in accordance with another illustrative embodiment of the invention.

FIG. 11 is a flowchart of a method for registering 3D data with 2D image data 1100 that includes semantic segmentation, in accordance with another illustrative embodiment of the invention. This method begins in the same way as method 1000 at blocks 1010 and 1020. At block 1110, 3D-data segmentation module 220 identifies a point-cloud cluster in the 3D data 280. At block 1120, data association module 230 associates this point-cloud cluster with an object, as discussed above. At block 1130, image segmentation module 240 performs semantic segmentation of the 2D image data 290, as explained above in connection with FIG. 5. At block 1060, as in method 1000, velocity estimation module 250 determines the speed and the heading (i.e., the velocity) of the object associated with the 3D segment.

At block 1140, integration module 260 either (1) shifts the point-cloud cluster to a position that, based on the associated object's speed and heading, corresponds to a time at which the 2D image data 290 was captured and projects the time-shifted point-cloud cluster onto 2D image space or (2) projects the point-cloud cluster onto 2D image space and shifts the projected point-cloud cluster to a position that, based on the associated object's speed and heading, corresponds to a time at which the 2D image data was captured.

At block 1150, integration module 260 counts the number of pixels in each of a plurality of classes that overlap with points in the time-shifted and projected point-cloud cluster, as discussed above. At block 1160, integration module 260 associates the time-shifted and projected point-cloud cluster with the class among the plurality of classes that has the greatest number pixels that overlap with points in the time-shifted and projected point-cloud cluster. By performing the foregoing operations at blocks 1140, 1150, and 1160, integration module 260 registers the 3D data with the corresponding 2D data, producing registered data 295.

Figure 12:
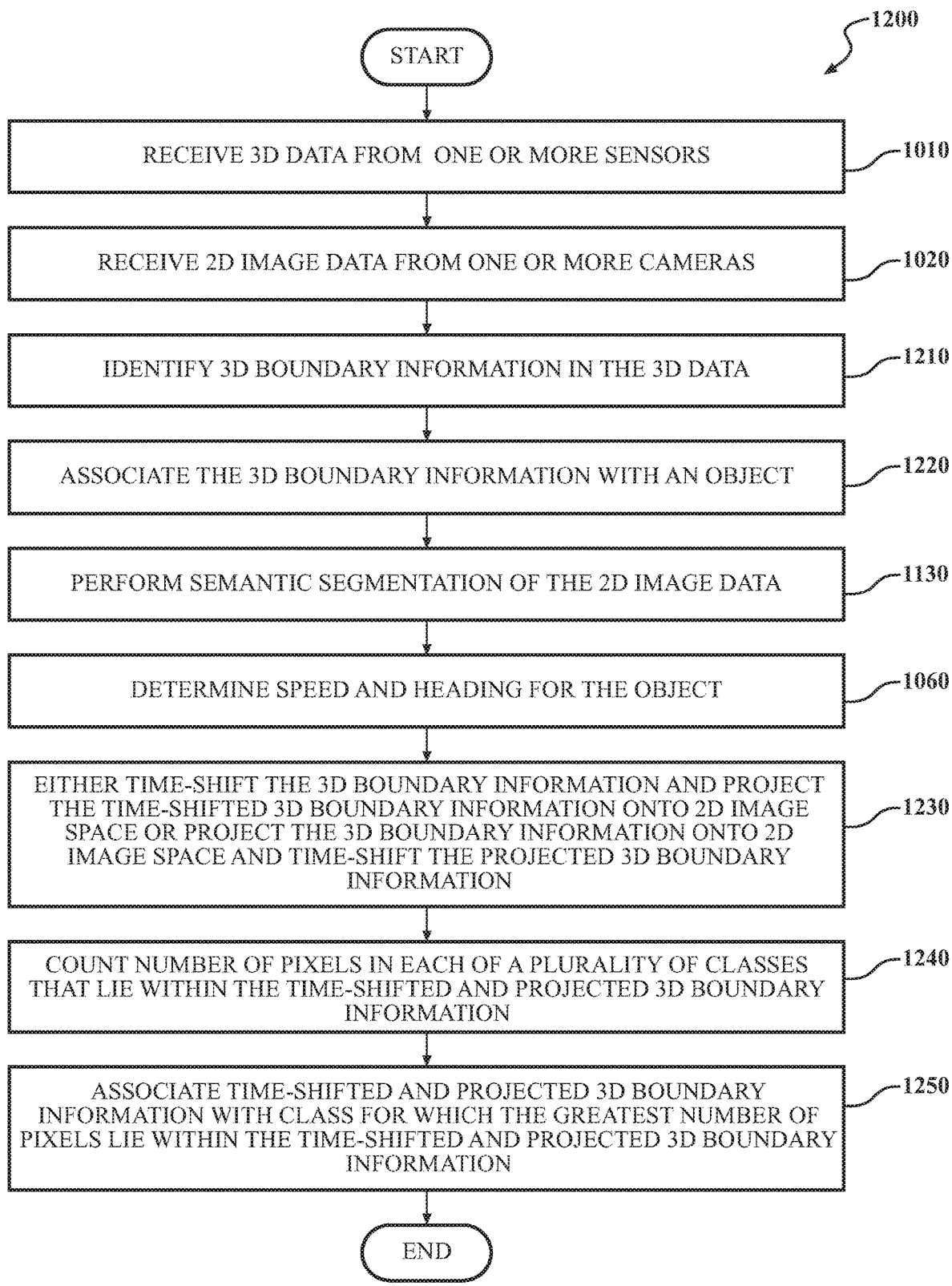
FIG. 12 is a flowchart of another method for registering 3D data with 2D image data that includes semantic segmentation, in accordance with another illustrative embodiment of the invention.

FIG. 12 is a flowchart of another method 1200 for registering 3D data with 2D image data that includes semantic segmentation, in accordance with another illustrative embodiment of the invention. This method begins in the same way as method 1000 at blocks 1010 and 1020. At block 1210, 3D-data segmentation module 220 identifies 3D boundary information in the 3D data 280. Examples of 3D boundary information include, without limitation, a convex hull, a voxelization, a non-convex hull, a bounding box, and mesh data. At block 1220, data association module 230 associates the 3D boundary information with an object. At block 1130, as in method 1100, image segmentation module 240 performs semantic segmentation of the 2D image data 290, as explained above in connection with FIG. 5. At block 1060, as in method 1000, velocity estimation module 250 determines the speed and the heading (i.e., the velocity) of the object associated with the 3D boundary information.

At block 1230, integration module 260 either (1) shifts the 3D boundary information to a position that, based on the associated object's speed and heading, corresponds to a time at which the 2D image data 290 was captured and projects the time-shifted 3D boundary information onto 2D image space or (2) projects the 3D boundary information onto 2D image space and shifts the projected 3D boundary information to a position that, based on the associated object's speed and heading, corresponds to a time at which the 2D image data was captured.

At block 1240, integration module 260 counts the number of pixels in each of a plurality of classes that lie within the boundaries of the time-shifted and projected 3D boundary information, as discussed above. At block 1250, integration module 260 associates the time-shifted and projected 3D boundary information with the class among the plurality of classes that has the greatest number pixels that lie within the time-shifted and projected 3D boundary information. By performing the foregoing operations at blocks 1230, 1240, and 1250, integration module 260 registers the 3D data with the corresponding 2D data, producing registered data 295.

Figure 13:
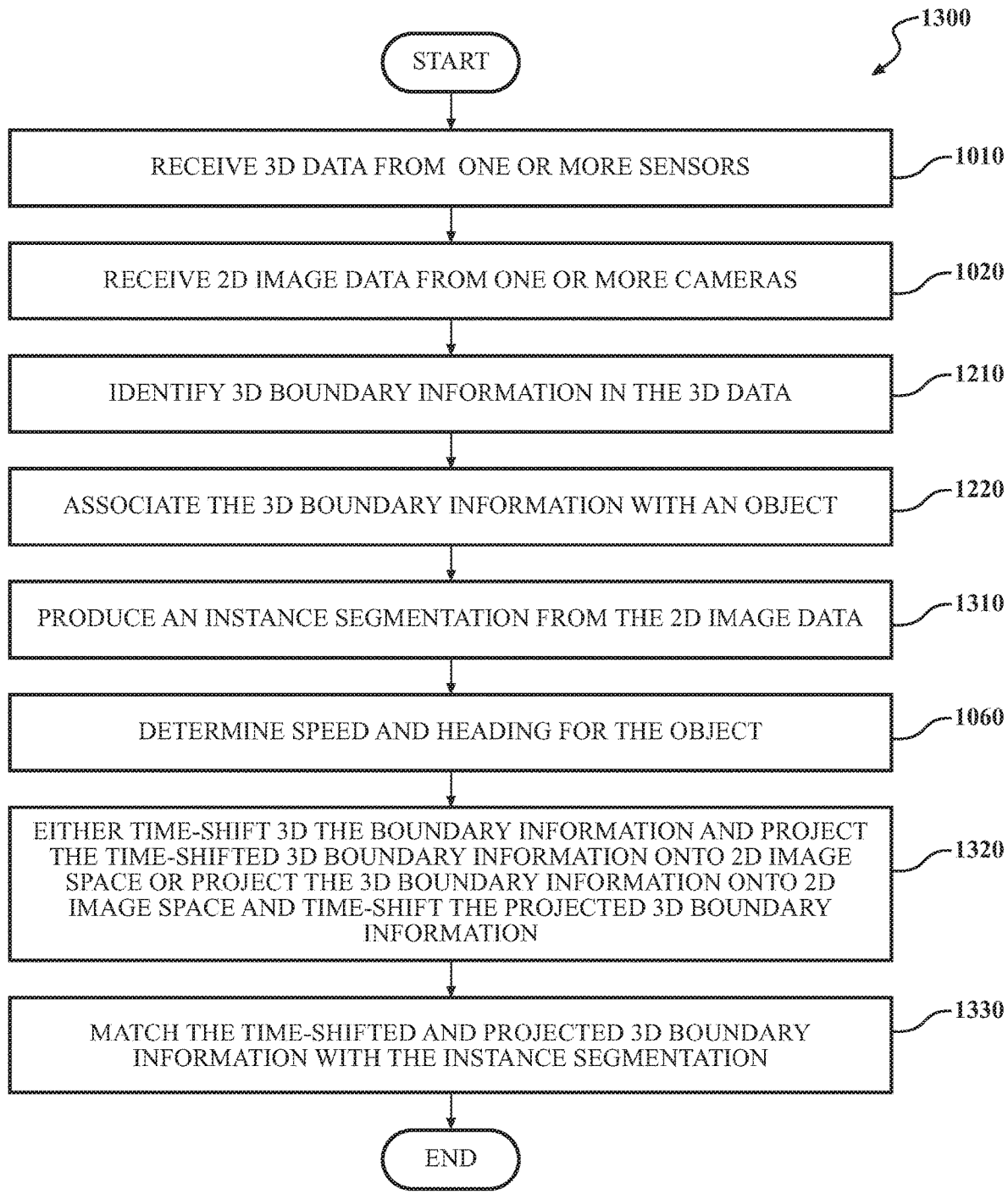
FIG. 13 is a flowchart of a method for registering 3D data with 2D image data that includes instance segmentation, in accordance with yet another illustrative embodiment of the invention.

FIG. 13 is a flowchart of a method for registering 3D data with 2D image data 1300 that includes instance segmentation, in accordance with yet another illustrative embodiment of the invention. This method begins in the same way as method 1000 at blocks 1010 and 1020, and the operations performed at blocks 1210 and 1220 are the same as in method 1200 discussed above in connection with FIG. 12. At block 1310, image segmentation module 240 produces an instance segmentation from the 2D image data 290, as discussed above in connection with FIG. 6. At block 1060, as in method 1000, velocity estimation module 250 determines the speed and the heading (i.e., the velocity) of the object associated with the 3D boundary information.

At block 1320, integration module 260 either (1) shifts the 3D boundary information to a position that, based on the associated object's speed and heading, corresponds to a time at which the 2D image data 290 was captured and projects the time-shifted 3D boundary information onto 2D image space or (2) projects the 3D boundary information onto 2D image space and shifts the projected 3D boundary information to a position that, based on the associated object's speed and heading, corresponds to a time at which the 2D image data was captured. At block 1330, integration module 260 matches the time-shifted and projected 3D boundary information with the instance segmentation to produce registered data 295. The matching of the time-shifted and projected 3D boundary information with the instance segmentation can be accomplished by using any of a variety of shape-matching algorithms that are well known to those skilled in the art, as discussed above.

Figure 14:
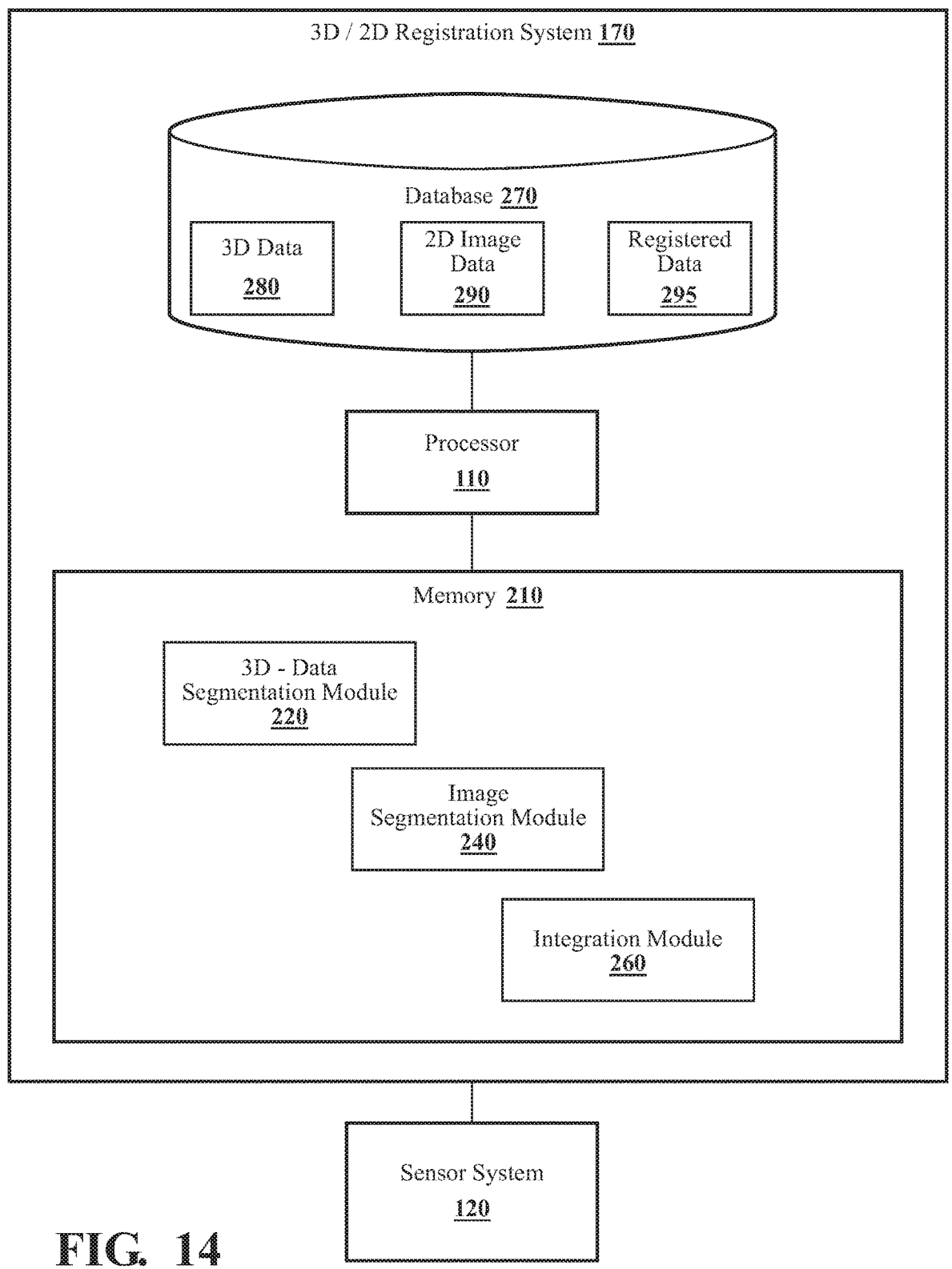
FIG. 14 illustrates another embodiment of a 3D/2D registration system.

FIG. 14 illustrates a different embodiment of a 3D/2D registration system 170. This embodiment does not include a data association module 230 or a velocity estimation module 250 because time-shifting based on the measured velocity of an object associated with a 3D segment to correct the "capture-timing gap" is not performed in this particular embodiment. Instead, this embodiment matches 3D boundary information (e.g., a convex hull) with instance-segmented 2D image data.

In the embodiment of FIG. 14, 3D/2D registration system 170 receives 2D image data 290 from one or more cameras 126 that are part of sensor system 120 and 3D data 280 from one or more sensors in sensor system 120. The sensors can include Light Detection and Ranging (LIDAR) sensors (see Element 124 in FIG. 1), a set of stereo cameras, Red Green Blue Depth (RGB-D) sensors, radar sensors (see Element 123 in FIG. 1), or a combination of one or more of these types of sensors or other sensors capable of capturing 3D data.

In the embodiment of FIG. 14, 3D-data segmentation module 220 identifies 3D boundary information in the 3D data 280 derived from a point-cloud cluster, as discussed above. Examples of 3D boundary information include, without limitation, a convex hull, a voxelization, a non-convex hull, a bounding box, and mesh data.

In this embodiment, image segmentation module 240 performs instance segmentation of the 2D image data 290. As discussed above in connection with the embodiments relating to FIG. 2 (see, in particular, the discussion of FIG. 6), this involves not only assigning a class label to each pixel in the 2D image data but also includes labeling regions of pixels belonging to the same class as a specific instance of a particular kind of object (e.g., Person No. 3 in a group of five people in the scene or Vehicle No. 2 in a row of vehicles parked along a street). In instance segmentation, the pixels associated with a particular instance of a class of object (e.g., a specific vehicle, building, tree, person, etc.) receive their own unique identifying color. One well-known algorithm for performing instance segmentation is MaskRCNN.

In the embodiment of FIG. 14, integration module 260 projects the 3D boundary information onto 2D image space and matches the shape of the projected 3D boundary information with an instance segmentation corresponding to a specific instance of a particular class of object (e.g., "Person No. 1," "Tree No. 4," "Vehicle No. 5"). Techniques for shape matching are well known to those skilled in the image-processing and machine-vision art. Such techniques can include, for example, looking for the closest (nearest-neighbor) instance segmentation relative to the 3D boundary information. Integration module 260 can employ any suitable shape-matching algorithm in performing 3D/2D registration. The final result produced by the embodiment of FIG. 14 is registered data 295.

Figure 15:
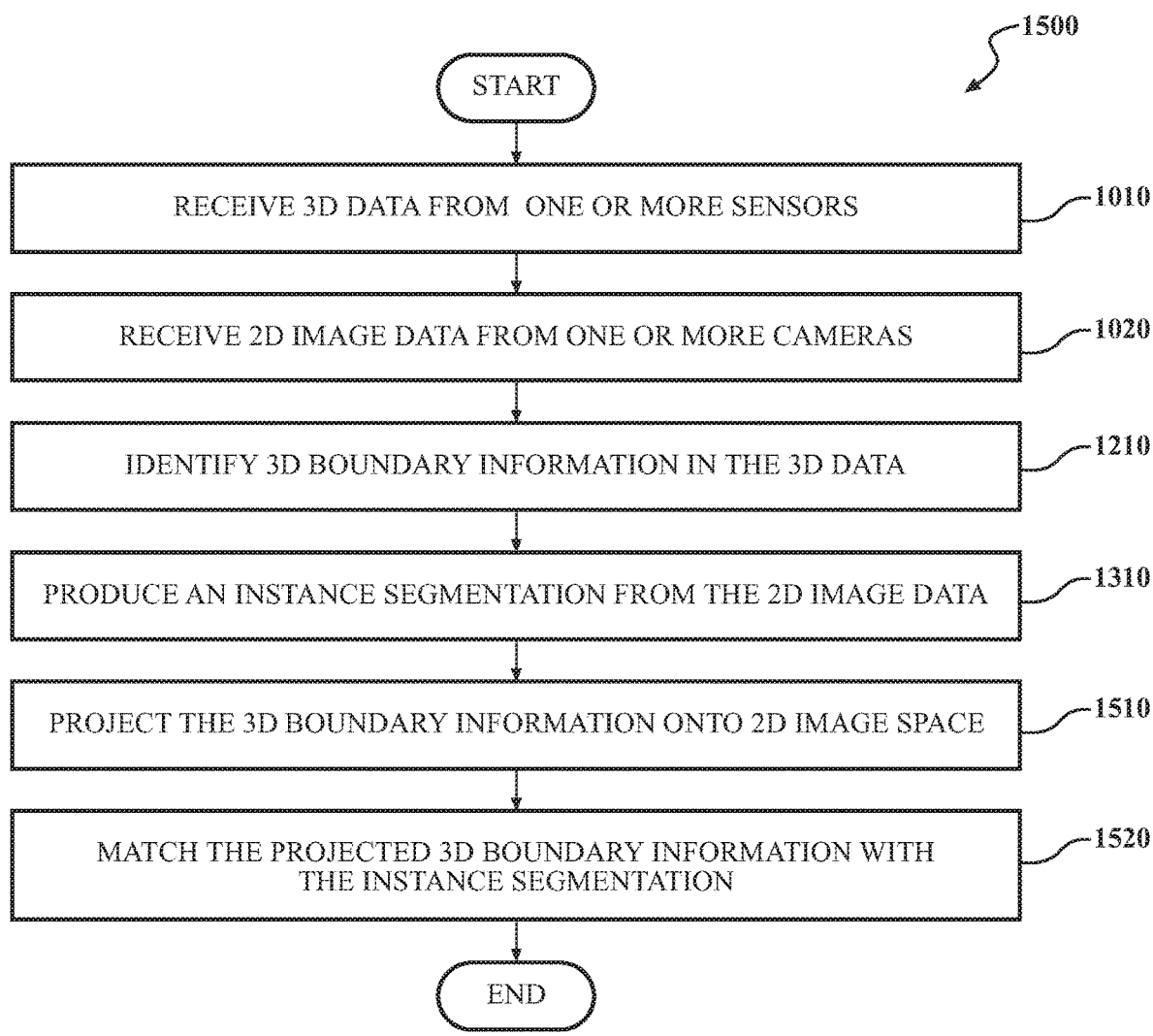
FIG. 15 is a flowchart of a method for registering 3D data with 2D image data, in accordance with another illustrative embodiment of the invention.

FIG. 15 is a flowchart of a method 1500 for registering 3D data with 2D image data, in accordance with another illustrative embodiment of the invention. Method 1500 corresponds to the embodiment of 3D/2D registration system 170 depicted in FIG. 14. At block 1010, 3D/2D registration system 170 (in FIG. 14) receives 3D data 280 from one or more sensors in sensor system 120. The sensors can include LIDAR sensors, a set of stereo cameras, RGB-D sensors, radar sensors, or a combination of one or more of these types of sensors or other sensors capable of capturing 3D data. At block 1020, 3D/2D registration system 170 (in FIG. 14) receives image data 290 from one or more cameras 126 that are part of sensor system 120. At block 1210, 3D-data segmentation module 220 identifies 3D boundary information in the 3D data 280. Examples of 3D boundary information include, without limitation, a convex hull, a voxelization, a non-convex hull, a bounding box, and mesh data. At block 1310, image segmentation module 240 produces an instance segmentation from the 2D image data 290, as discussed above in connection with FIG. 6.

At block 1510, integration module 260 projects the 3D boundary information onto 2D image space. At block 1520, integration module 260 matches the projected 3D boundary information with the instance segmentation to produce registered data 295.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the 3D/2D registration system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the 3D/2D registration system 170, and/or the autonomous driving module(s) 160 may control some or all of these vehicle systems 140 and, thus, may be partially or fully autonomous.

The processor(s) 110, the 3D/2D registration system 170, and/or the autonomous driving module(s) 160 can be operably connected to communicate with the various vehicle systems 140 and/or individual components thereof. For example, returning to FIG. 1, the processor(s) 110, the 3D/2D registration system 170, and/or the autonomous driving module(s) 160 can be in communication to send and/or receive information from the various vehicle systems 140 to control the movement, speed, maneuvering, heading, direction, etc. of the vehicle 100. The processor(s) 110, the 3D/2D registration system 170, and/or the autonomous driving module(s) 160 may control some or all of these vehicle systems 140.

The processor(s) 110, the 3D/2D registration system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the 3D/2D registration system 170, and/or the autonomous driving module(s) 160 can control the direction and/or speed of the vehicle 100. The processor(s) 110, the 3D/2D registration system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the 3D/2D registration system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle.

Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-15, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for registering three-dimensional (3D) data with two-dimensional (2D) image data, the system comprising:
    one or more sensors to produce 3D data;
    one or more cameras to produce 2D image data;
    one or more processors;
    a memory communicably coupled to the one or more processors and storing:
    a 3D-data segmentation module including instructions that when executed by the one or more processors cause the one or more processors to identify, in the 3D data, a 3D segment;
    a data association module including instructions that when executed by the one or more processors cause the one or more processors to associate the 3D segment with an object;
    an image segmentation module including instructions that when executed by the one or more processors cause the one or more processors to classify pixels in the 2D image data;
    a velocity estimation module including instructions that when executed by the one or more processors cause the one or more processors to determine a speed and a heading for the object; and
    an integration module including instructions that when executed by the one or more processors cause the one or more processors to register the 3D segment with a portion of the classified pixels in the 2D image data by performing one of:
        shifting the 3D segment to a position that, based on the associated object's speed and heading, corresponds to a time at which the 2D image data was captured and projecting the time-shifted 3D segment onto 2D image space; and
        projecting the 3D segment onto 2D image space and shifting the projected 3D segment to a position that, based on the associated object's speed and heading, corresponds to a time at which the 2D image data was captured.

2. The system of claim 1, wherein the one or more sensors include at least one of a Light Detection and Ranging (LIDAR) sensor, a set of stereo cameras, a Red Green Blue Depth (RGB-D) sensor, and a radar sensor, and the 3D segment is a point-cloud cluster.

3. The system of claim 2, wherein the image segmentation module further includes instructions to perform semantic segmentation of the 2D image data, the semantic segmentation assigning a class label to each pixel in the 2D image data to classify that pixel, and the integration module further includes instructions to count the number of pixels in at least one class that overlap with points in the time-shifted and projected point-cloud cluster.

4. The system of claim 3, wherein the integration module further includes instructions to:
    count the number of pixels in each of a plurality of classes that overlap with points in the time-shifted and projected point-cloud cluster; and
    associate the time-shifted and projected point-cloud cluster with a class in the plurality of classes for which the greatest number of pixels overlap with points in the time-shifted and projected point-cloud cluster.

5. The system of claim 1, wherein the 3D segment is 3D boundary information that includes one of a convex hull, a voxelization, a non-convex hull, a bounding box, and mesh data.

6. The system of claim 5, wherein the image segmentation module further includes instructions to produce an instance segmentation from the classified pixels in the 2D image data, the instance segmentation identifying the portion of the classified pixels in the 2D image data as a specific instance of a particular class of object, and the integration module further includes instructions to match the time-shifted and projected 3D boundary information with the instance segmentation.

7. The system of claim 5, wherein the image segmentation module further includes instructions to perform semantic segmentation of the 2D image data, the semantic segmentation assigning a class label to each pixel in the 2D image data to classify that pixel, and the integration module further includes instructions to count the number of pixels in at least one class that lie within the time-shifted and projected 3D boundary information.

8. The system of claim 7, wherein the integration module further includes instructions to:
   count the number of pixels in each of a plurality of classes that lie within the time-shifted and projected 3D boundary information; and
   associate the time-shifted and projected 3D boundary information with a class in the plurality of classes for which the greatest number of pixels lie within the time-shifted and projected 3D boundary information.

9. A method of registering three-dimensional (3D) data with two-dimensional (2D) image data, the method comprising:
   receiving 3D data from one or more sensors;
   receiving 2D image data from one or more cameras;
   identifying a 3D segment in the 3D data;
   associating the 3D segment with an object;
   classifying pixels in the 2D image data;
   determining a speed and a heading for the object; and
   registering the 3D segment with a portion of the classified pixels in the 2D image data by performing one of:
      shifting the 3D segment to a position that, based on the associated object's speed and heading, corresponds to a time at which the 2D image data was captured and projecting the time-shifted 3D segment onto 2D image space; and
      projecting the 3D segment onto 2D image space and shifting the projected 3D segment to a position that, based on the associated object's speed and heading, corresponds to a time at which the 2D image data was captured.

10. The method of claim 9, wherein the one or more sensors include at least one of a Light Detection and Ranging (LIDAR) sensor, a set of stereo cameras, a Red Green Blue Depth (RGB-D) sensor, and a radar sensor, and the 3D segment is a point-cloud cluster.

11. The method of claim 10, wherein classifying pixels in the 2D image data includes performing semantic segmentation of the 2D image data, the semantic segmentation assigning a class label to each pixel in the 2D image data, and the registering includes counting the number of pixels in at least one class that overlap with points in the time-shifted and projected point-cloud cluster.

12. The method of claim 11, wherein the registering includes:
   counting the number of pixels in each of a plurality of classes that overlap with points in the time-shifted and projected point-cloud cluster; and
   associating the time-shifted and projected point-cloud cluster with a class in the plurality of classes for which the greatest number of pixels overlap with points in the time-shifted and projected point-cloud cluster.

13. The method of claim 9, wherein the 3D segment is 3D boundary information that includes one of a convex hull, a voxelization, a non-convex hull, a bounding box, and mesh data.

14. The method of claim 13, wherein classifying pixels in the 2D image data includes producing an instance segmentation, the instance segmentation identifying the portion of the classified pixels in the 2D image data as a specific instance of a particular class of object, and the registering includes matching the time-shifted and projected 3D boundary information with the instance segmentation.

15. The method of claim 13, wherein classifying pixels in the 2D image data includes performing semantic segmentation of the 2D image data, the semantic segmentation assigning a class label to each pixel in the 2D image data to classify that pixel, and the registering includes counting the number of pixels in at least one class that lie within the time-shifted and projected 3D boundary information.

16. The method of claim 15, wherein the registering includes:
   counting the number of pixels in each of a plurality of classes that lie within the time-shifted and projected 3D boundary information; and
   associating the time-shifted and projected 3D boundary information with a class in the plurality of classes for which the greatest number of pixels lie within the time-shifted and projected 3D boundary information.

17. A system for registering three-dimensional (3D) data with two-dimensional (2D) image data, the system comprising:
   one or more sensors to produce 3D data;
   one or more cameras to produce 2D image data;
   one or more processors; and
   a memory communicably coupled to the one or more processors and storing:
   a 3D-data segmentation module including instructions that when executed by the one or more processors cause the one or more processors to identify, in the 3D data, 3D boundary information that includes one of a convex hull, a voxelization, a non-convex hull, a bounding box, and mesh data;
   an image segmentation module including instructions that when executed by the one or more processors cause the one or more processors to produce an instance segmentation from pixels in the 2D image data, the instance segmentation identifying a portion of the pixels in the 2D image data as a specific instance of a particular class of object; and
   an integration module including instructions that when executed by the one or more processors cause the one or more processors to:
      project the 3D boundary information onto 2D image space to produce projected 3D boundary information; and
      match the projected 3D boundary information with the instance segmentation to register the projected 3D boundary information with the instance segmentation;
   a data association module including instructions that when executed by the one or more processors cause the one or more processors to associate the 3D boundary information with an object; and
   a velocity estimation module including instructions that when executed by the one or more processors cause the one or more processors to determine a speed and a heading for the object;
   wherein the integration module further includes instructions to perform one of:
      before the 3D boundary information is projected onto 2D image space, shifting the 3D boundary information to a position that, based on the associated object's speed and heading, corresponds to a time at which the 2D image data was captured; and after the 3D boundary information has been projected onto 2D image space, shifting the projected 3D boundary information to a position that, based on the associated object's speed and heading, corresponds to a time at which the 2D image data was captured.

18. A method of registering three-dimensional (3D) data with two-dimensional (2D) image data, the method comprising:

receiving 3D data from one or more sensors;

receiving 2D image data from one or more cameras;

identifying 3D boundary information in the 3D data;

producing an instance segmentation from pixels in the 2D image data, the instance segmentation identifying a portion of the pixels in the 2D image data as a specific instance of a particular class of object;

projecting the 3D boundary information onto 2D image space to produce projected 3D boundary information; and matching the projected 3D boundary information with the instance segmentation to register the projected 3D boundary information with the instance segmentation;

associating the 3D boundary information with an object;

determining a speed and a heading for the object; and performing one of:

before the 3D boundary information is projected onto 2D image space, shifting the 3D boundary information to a position that, based on the associated object's speed and heading, corresponds to a time at which the 2D image data was captured; and after the 3D boundary information has been projected onto 2D image space, shifting the projected 3D boundary information to a position that, based on the associated object's speed and heading, corresponds to a time at which the 2D image data was captured.

* * * * *